United States Patent [19]

Herman

[11] Patent Number: 4,656,577
[45] Date of Patent: Apr. 7, 1987

[54] PRECISION, FULLY CONTROLLED, METERING BLADE POSITIONING SYSTEM

[76] Inventor: Kenneth W. Herman, 6 Goldman Rd., Orange, Conn. 06477

[21] Appl. No.: 717,337

[22] Filed: Mar. 29, 1985

[51] Int. Cl.⁴ .................... G06F 15/46; B41F 31/00
[52] U.S. Cl. ................................. 364/167; 101/350; 118/262; 318/603; 318/625; 364/468
[58] Field of Search ............... 364/167, 174, 468, 469; 101/152, 153, 157, 169, 350, 365; 118/249, 261, 262; 318/625, 600–604

[56] References Cited

U.S. PATENT DOCUMENTS

| | | | |
|---|---|---|---|
| 4,127,067 | 11/1978 | Dahlgren et al. | 101/148 X |
| 4,372,203 | 2/1983 | Brasa | 101/124 |
| 4,381,708 | 5/1983 | Hirt et al. | 101/365 |
| 4,438,694 | 3/1984 | Parkins et al. | 101/152 |

Primary Examiner—Joseph Ruggiero
Attorney, Agent, or Firm—Mattern, Ware, Stoltz & Freesola

[57] ABSTRACT

A precision, fully controlled, metering-blade positioning system is achieved by providing dual, precision-constructed, direct, travel-distance measuring means interconnected in a closed loop with dual, blade movement drive motors and an information/movement controller. In the preferred embodiment, the dual, direct, travel-distance measuring means are mounted independently from each other at opposite ends of the blade, thereby assuring that each end of the blade is in the precise, desired position relative to a pre-set reference position. By independently, precisely positioning each of the opposite ends of the metering blade, the user is assured that the metering blade is in the exactly desired position, and in complete, precise parallel alignment along its entire length with a co-operating roller member.

16 Claims, 7 Drawing Figures

PRECISION, FULLY CONTROLLED, METERING BLADE POSITIONING SYSTEM

TECHNICAL FIELD

This invention relates to metering blade or roller positioning systems, and more particularly to precision controlled metering blade or roller positioning systems for use in positioning metering blades or rollers above a cooperating roller or cylinder.

BACKGROUND ART

In many prior art production systems, metering blades, doctor blades, or metering rollers are required to be positioned above a rotating cylinder at a very specific, controlled distance. Such systems include printing or inking operations, application of ink material to elongated, continuous webs, as well as in the textile industry for the application of various dyes or insulating material to elongated continuous webs of material.

In spite of the wide variety of applications and systems in which precise control of metering blades, doctor blades, or metering rollers relative to a fixed bed or rotating drum is required, no prior art system has been able to achieve a reasonably priced, precision metering blade positioning system.

In general, most prior art systems incorporate a single drive motor typically connected near one end of the doctor blade, metering blade, or metering roller with said single motor being employed to move the entire metering blade or roller into the desired position. However, due to typical inherent problems, such as gear train backlash, precise control over the gap between the metering blade or roller and the fixed roller, along the entire length thereof, has been impossible to obtain, especially in situations where precision is mandatory.

In an attempt to satisfy the increasing need for obtaining a precise, controlled gap between a metering blade or metering roller, and the coating roller with which it is associated, more sophisticated, electronic distance-measuring systems were employed. However, all of these prior art systems suffer from the universal drawback that the measuring system is mounted at one end of the metering blade or roller, with the opposed end being moved simultaneously therewith. As a result, these prior art systems have failed to meet the requisite need for obtaining precise gap distances along the entire length of the metering blade.

Another prior attempt to satisfy this need for precise gap control was the use of hydraulic systems to move the metering blade or roller to the desired position. These systems typically use a single, central piston cylinder to controllably move both ends of the metering blade or roller to the desired position. However, due to leakage problems and pressure control difficulties, these hydraulic prior art systems have been completely incapable of attaining or maintaining prece gap distances between a metering blade and its accompanying roller.

Consequently, it is a principal object of the present invention to provide a metering blade or roller positioning system which is capable of repeatably and reliably positioning metering-blades with a desired, precise gap width which extends along the entire blade length.

Another object of the present invention is to provide a metering blade or roller positioning system having the characteristic features described above which is capable of accurately positioning the metering blade or roller within 0.0005 inches of the desired position along the entire length of the blade.

Another object of the present invention is to provide a metering blade or roller positioning system having the characteristic features described above which is capable of automatic as well as manual control.

A further object of the present invention is to provide a metering blade or roller positioning system having the characteristic features described above which is capable of being operated efficiently in any desired environment, without fear of difficulty or adverse impact on the processes being conducted.

Another object of the present invention is to provide a metering blade or roller positioning system having the characteristic features described above which is explosion-proof and intrinsically safe in operation.

Other and more specific objects will in part be obvious and will in part appear hereinafter.

SUMMARY OF THE INVENTION

The present invention overcomes the inabilities and inadequacies of prior art systems by providing two, independent, high precision, linear transducers mounted at each end of the metering blade or roller, and two, separate, independent drive motors mounted in conjunction with each linear transducer at each end of the metering blade or roller. In addition, an information/movement controller is interconnected with the drive motors and the linear transducers.

The information/movement controller receives direct, precise position information from the linear transducers mounted at both ends of the metering blade or roller, interprets the information received and uses this information to activate the drive motors to move the metering blade or roller to the precise, desired position. In this way, highly accurate, precise metering blade or roller positioning is attained, which has heretofore been completely unattainable in prior art systems.

For purpose of convenience, the following disclosure refers to a system for precisely controlling a metering blade. The present invention, however, is applicable to all metering systems regardless of whether a blade or a roller is employed. Consequently, the references to metering blades are intended to be broadly interpreted to include doctor blades and metering rollers.

In the preferred embodiment, each of the independent, high precision, linear transducers which are mounted at both ends of the metering blade, comprise high resolution glass lined scales. The glass lined scales are preferably mounted directly to the metering blade, at both ends thereof, with independent read devices or transducers fixedly mounted to the support system in order to provide the controller with the desired direct reading of the precise position of each of the two ends of the metering blade. By precisely controlling and accurately, directly positioning each end of the metering blade, accurate positioning of the metering blade along its entire length, relative to the cooperating rotating drum or cylinder is assured.

In the preferred embodiment, the precision, fully controlled, metering-blade positioning system of the present invention is constructed in one of two alternate configurations. In one embodiment, one of the two linear transducers is employed as the reference for the second transducer.

In this embodiment, the information/movement controller continuously receives position information from both linear transducers and compares the information received. Any time the position of the two linear transducers is different, the information/movement controller automatically activates the drive motor of the non-reference or slave end of the metering blade to move in a direction which will bring that end of the blade into the identical position of the reference or master end of the blade. As a result, this embodiment assures that both ends of the blade are always maintained at precisely identical positions, relative to the roller, thereby assuring a precise, continuously controlled gap width extending between and maintaining the metering blade and the roller in perfect parallel alignment.

In the alternate embodiment of the present invention, a separate master position display is provided which is adjusted by the operator. In this embodiment, the position of each end of the metering blade, as determined by the linear transducers mounted thereto, is separately maintained and, preferably, displayed on two different digital readouts.

The information/movement controller continuously compares the position of each end of the blade with the master position indicator, and automatically controls the drive motors to move the metering blade to the precise position which corresponds with the master position set by the operator. In this way, both ends of the blade are moved directly into the position set by the operator.

In the preferred embodiment of the present invention, the metering blade positioning system also incorporates separate, manually activatable home position movement controls and incremental movement controls. The home position movement controls are employed to move the metering blade to a particularly desired, pre-set "home" location for the operation of the system. Using the home position controls, the metering blade positioning system of this invention automatically moves the metering blade to the desired home position for the operation of the system. If, during the operation of the system, gear backlash allows the metering blade to move out of the home position, the system automatically returns the metering blade to the home position.

The manually adjustable incremental movement controls allow the operator to define a particularly desired distance, or a plurality of distances through which the metering blade should move during the overall operation and use of the system. In this way, whenever movement of the metering blade through this pre-set incremental distance is desired, the operator need only activate the controls. Once activated, the metering blade automatically moves from its particular position through the pre-set, incremental distance.

Using this incremental movement feature, multiple coatings can be quickly and easily applied to a particular substrate. Typically, the first coating is applied to the desired material at the home position. Then, the metering blade is raised through the pre-set incremental distance which corresponds to the added thickness required for the second coating. If only two coatings are required, the metering blade is quickly and easily returned to the home position by activating the home position movement controls, once the second coating is applied. In this way, the measuring blade is ready for having the first coating applied to the next run of material. If more than two coatings are required, the blade is raised again through the pre-set incremental distance.

The invention accordingly comprises the features of construction, combinations of elements and arrangements of parts which will be exemplified in the constructions hereinafter set forth, and the scope of the invention will be indicated in the claims.

THE DRAWINGS

For a fuller understanding of the nature and objects of the invention, reference should be had to the following detailed description taken in connection with the accompanying drawings in which.

Figure 4:
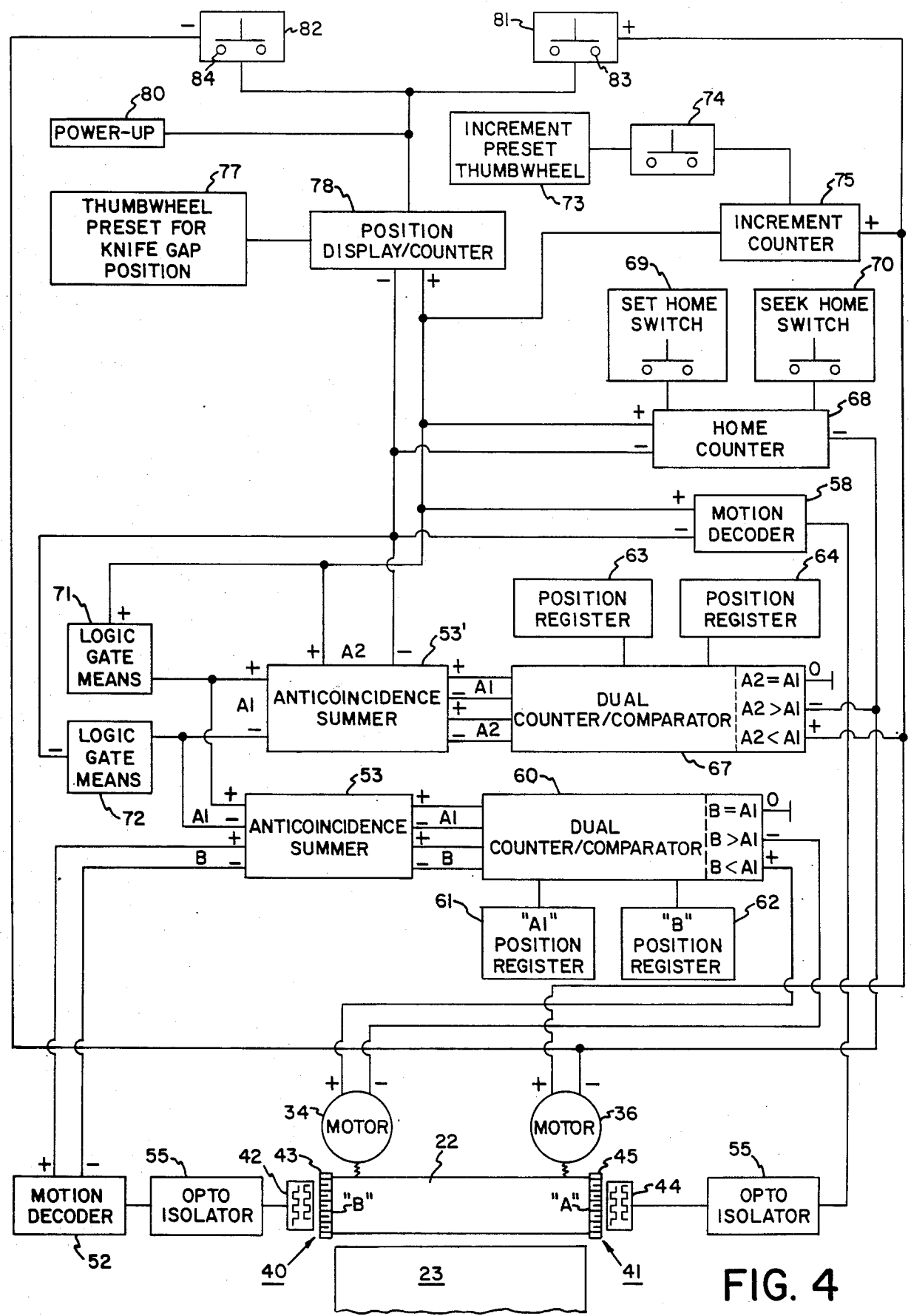
Figure 5:
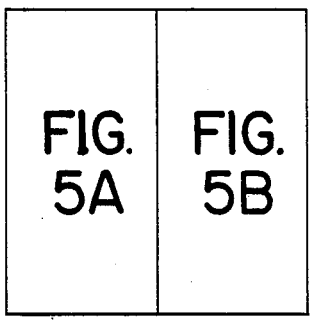
Figure 5A:
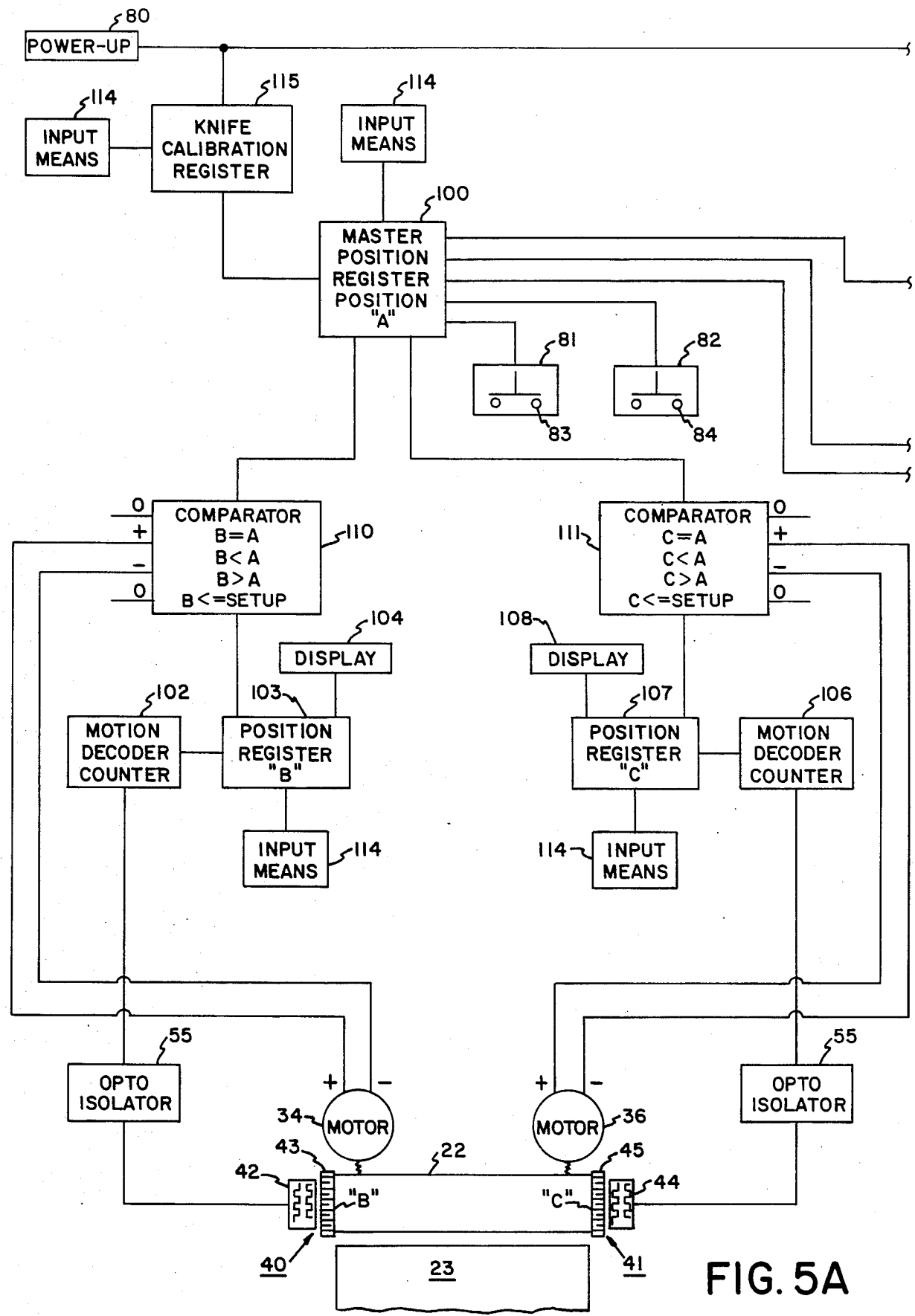
Figure 5B:
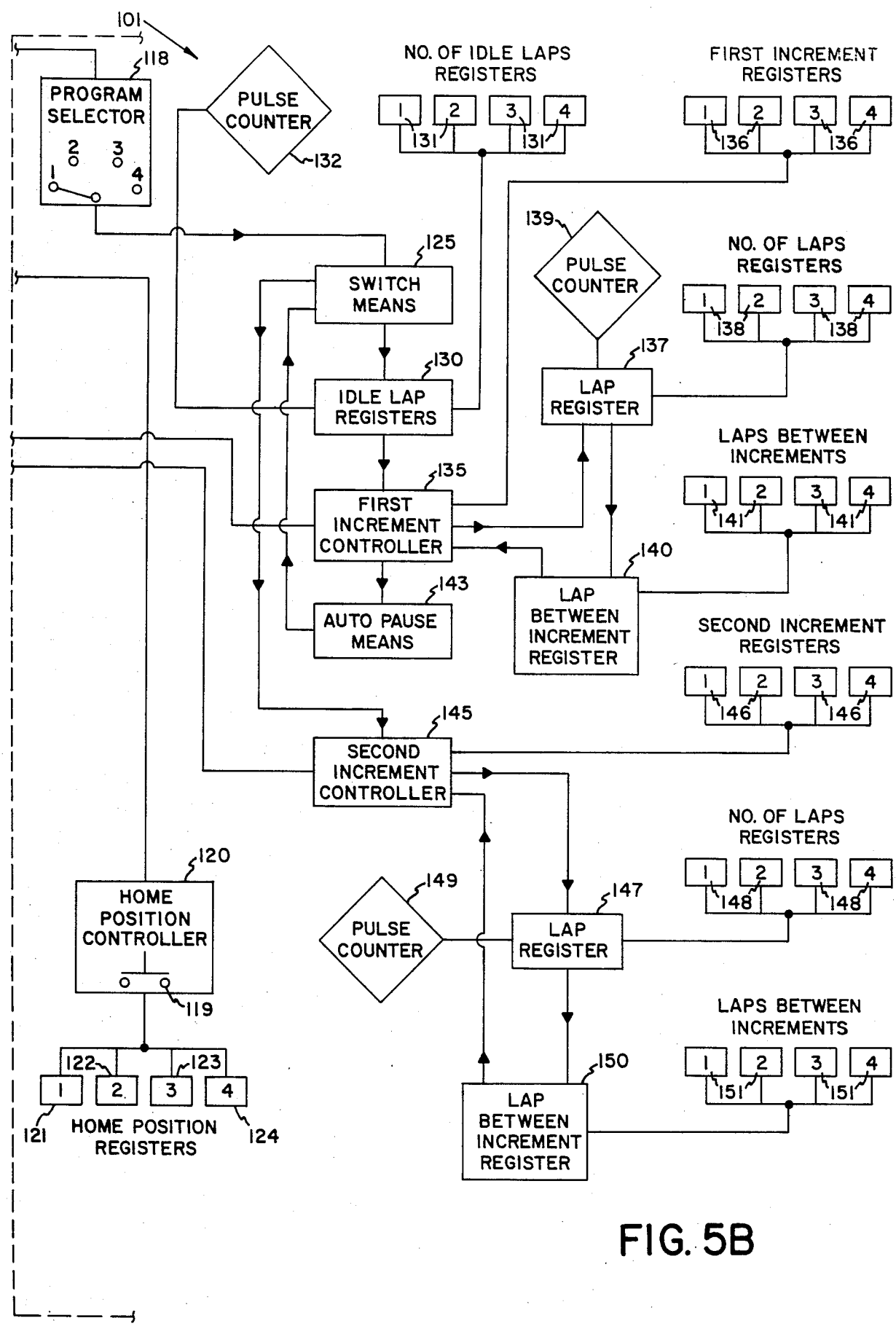

FIG. 4 a schematic block diagram of a second embodiment of the metering blade positioning system of the present invention; and FIG. 5 is composed of FIGS. 5A and 5B, which are combined as shown, to detail a schematic block diagram of a third embodiment of the metering blade positioning system of the present invention.

DETAILED DESCRIPTION

Figure 1:
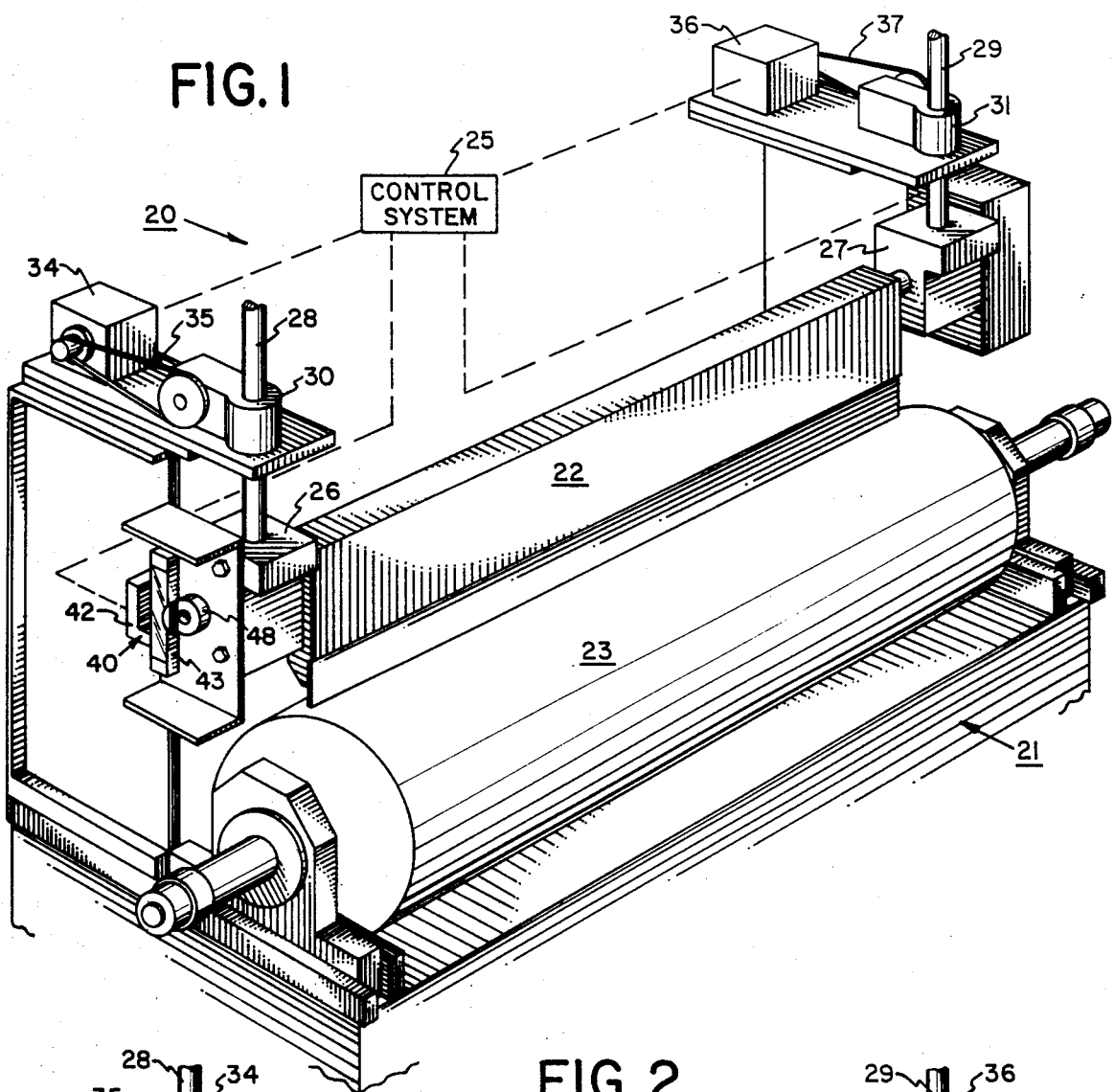
FIG. 1 is a perspective view of the precision metering blade positioning system of the present invention, with the electronic controls depicted schematically.

In FIG. 1, precision metering blade positioning system 20 of the present invention is shown associated with and operatively controlling a continuous, material coating machine 21. In this embodiment, coating machine 21 incorporates a doctor blade 22 in juxtaposed, spaced, cooperating relationship with a cylindrically-shaped, rotatable coating roller 23. In the preferred construction, both doctor blade 22 and coating roller 23 are precisely made, in order to assure that the operative surfaces of each component contain no unwanted recesses, pits, etc. thereby assuring that the precise coating thickness desired in applied to the substrate.

Figure 2:
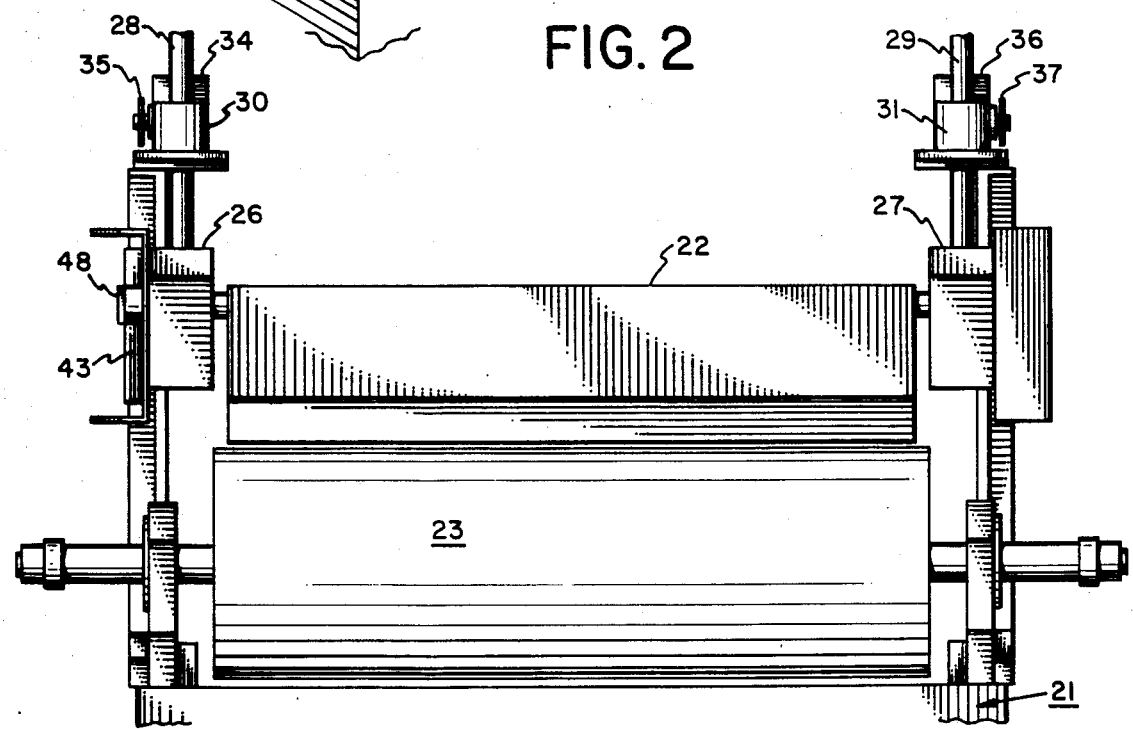
FIG. 2 is a front elevation view of the metering blade positioning system, of FIG. 1.

As shown in FIGS. 1 and 2, doctor blade 22 is mounted at its opposed ends to support blocks 26 and 27. Support block 26 is securely affixed to an elongated gear shaft 28, while support block 27 is securely affixed to elongated gear shaft 29. Gear shaft 28 is drivingly engaged in gear box 30 for axial movement therethrough, while gear shaft 29 is drivingly engaged in gear box 31 for axial movement therethrough.

The axial movement of gear shaft 28 is controlled by drive motor 34, by way of timing belt 35 which is directly connected between drive motor 34 and gear box 30. Similarly, the opposite end of doctor blade 22 incorporates a drive motor 36 and timing belt 37 to directly control gear box 31 and the axial movement of gear shaft 29.

In the preferred embodiment, drive motors 34 and 36 each comprise a bi-directional, slow speed, synchronous motor which is capable of controllably driving its associated timing belt to cause its associated gear box to raise or lower gear shaft 28 or 29 to precisely desired distances. In the preferred embodiment of the precision, metering blade positioning system of this invention, precise position measuring means 40 are mounted in cooperating, position reading engagement with one end of doctor blade 22. Similarly, precise, position measuring means 41 are mounted in cooperating engagement with the opposed end of doctor blade 22.

Precision measuring means 40 preferably comprise a reading head 42 and a precision constructed glass lined scale 43. Reading head 42 is fixedly mounted to coating machine 21 in juxtaposed, spaced, aligned reading engagement with glass lined scale 43. Scale 43 is mounted to support block 26 for vertical movement therewith in response to the axial movement of gear shaft 28. In this way, any movement of gear shaft 28 caused by motor 34 is precisely measured by the movement of glass lined scale 43 relative to reading head 42.

In accordance with the teaching of the present invention, the opposed end of metering blade 22 incorporates separate, independent position measuring means 41 which comprise a reading head 44 and cooperatingly associated glass lined scale 45. Reading head 44 is fixedly mounted to cutting machine 21 in juxtaposed, spaced, cooperating, aligned, reading engagement with glass lined scale 45. Scale 45 is mounted to support block 27 for movement therewith in response to the axial movement of gear shaft 29.

As in more fully detailed below, reading heads 42 and 44 are connected to control system 25, to provide control system 25 with the precise position information obtained from position measuring means 40 and 41. In addition, motors 34 and 36 are responsively connected to control system 25 for the receipt of direct activation signals therefrom, in order to cause gear shafts 28 and 29 to either raise or lower doctor blade 22 to obtain the precise, desired position.

By employing the system of the present invention, the precise position of doctor blade 22 is independently and directly obtained at each end of the blade by employing independent measuring means at each end thereof. This information is then employed to operate two, independent drive motors mounted at opposite ends of the blade. As a result, the position of doctor blade 22 is directly controlled to assure that each end of the doctor blade is in precisely the desired position relative to the coating roller 23. In this way, the desired gap distance between doctor blade 22 and roller 23 is attained with assurance that the gap system is precisely the same along the entire length of doctor blade 22 and roller 23.

As shown in FIGS. 1 and 2, doctor blade 22 is typically mounted at its terminating ends with journals 48 and 49. Journals 48 and 49 are employed to allow doctor blade 22 to be rotated after use out of the aligned, cooperating position to provide ease of access to the doctor blade to assure complete cleaning thereof. In addition, in the preferred embodiment of the present invention, each end of the doctor blade is mounted within a closed container in order to cover and protect the precise, position measuring means 40 and 41 as well as journals 48 and 49.

Figure 3:
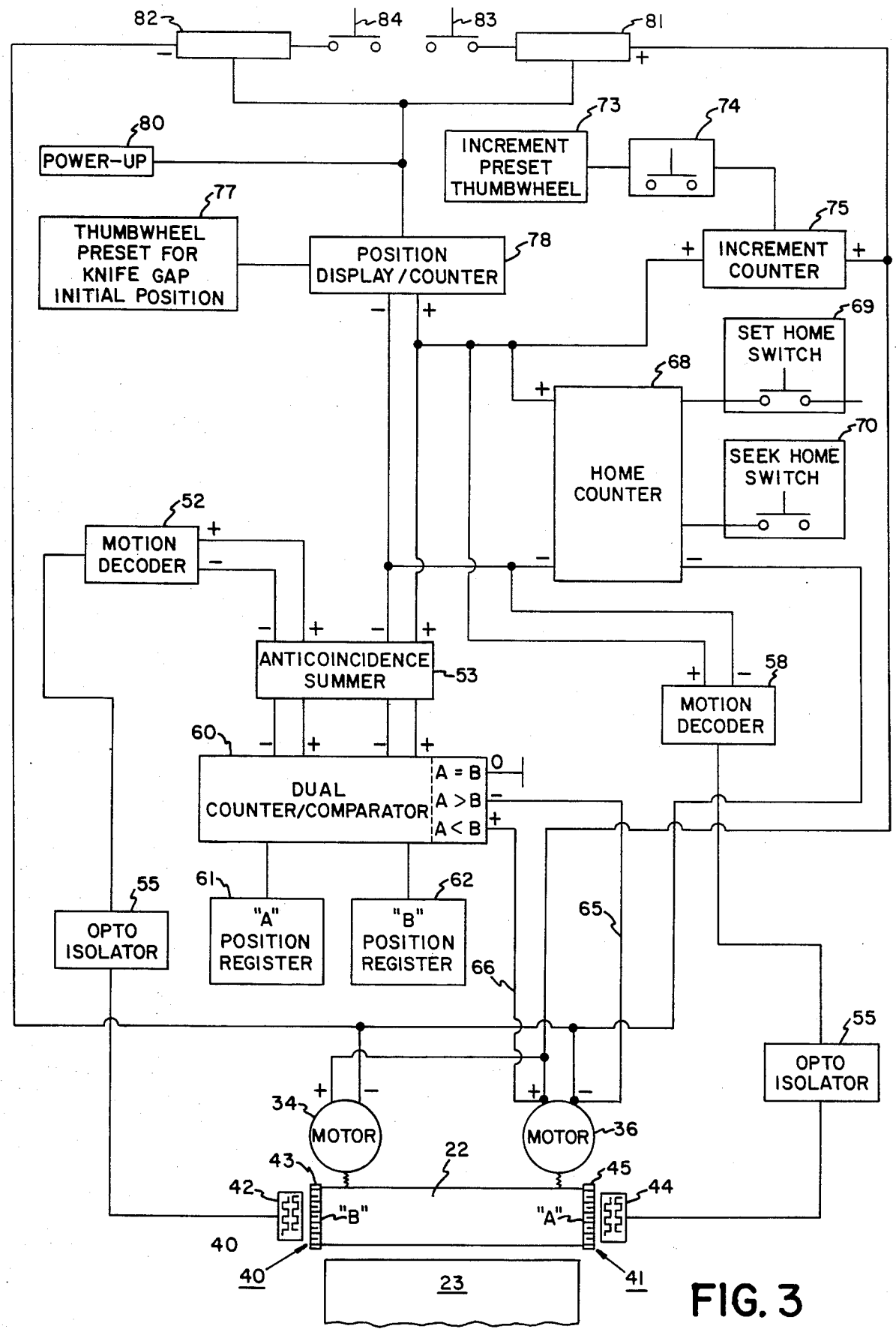
FIG. 3 is a schematic block diagram of one embodiment of the metering blade positioning system of the present invention.

In FIG. 3, one embodiment of the precision, metering blade positioning blade system of the present invention is depicted in a schematic block diagram. As shown therein, doctor blade 22, roller 23, drive motors 34 and 36 as well as precision positioning measuring means 40 and 41 are diagrammatically represented in cooperating controlled communication with control system 25. In addition, control system 25 is shown, in detail, with the various components forming control system 25 schematically represented. By referring to FIG. 3, along with the following detailed discussion, the overall operation and construction of this embodiment of the precision metering blade positioning system of the present invention can best be understood.

In this embodiment, the position of metering blade 22 relative to roller 23 is controlled by independently precisely measuring the exact distance through which both ends of metering blade 22 travels from a preset reference point. Then, in order to assure the precise parallel alignment desired between metering blade 22 and cooperating coating roller 23, control system 25 continuously monitors and automatically controls the position of blade 22 to assure that each end of metering blade 22 has moved through exactly identical distances and is maintained at the precisely desired parallel position.

As discussed above, this precision control is attained by independently measuring and independently moving the two opposed ends of metering blade 22. By employing this construction, the movement of each end of metering blade 22 is independently directly controlled to attain the precise position desired. In this way, precise positioning and parallel cooperating alignment of the metering blade with coating roller 23 is assured.

In the preferred embodiment, the position measuring means 40 and 41 comprise fixedly mounted reading heads 42 and 44 which are in aligned, cooperating, reading engagement with precision constructed, glass lined scales 43 and 45. Since glass lined scales 43 and 45 are constructed with electronically readable line measurements, the precision attained by employing this measuring means allows metering blade 22 to be positioned within at least 0.0005 inches of the desired position, and most often within 0.0001 inches of the desired position. In the preferred embodiment, glass lined scales 43 and 45 are constructed with 62.5 lines per millimeter (1587.5 lines per inch) and have a resolution of 0.0001 inch to assure the desired precision measurements.

In operation, the movement of metering blade 22 by motors 34 and 36 causes glass lined scales 43 and 45 to move simultaneously therewith. This movement causes reading head 42 to generate signals directly proportional to each line of scale 43 which passes by reading head 42. Preferably, reading head 42 produces a square wave signal containing four independent pulses for each line of scale 43. As shown in FIG. 3, in this embodiment, the signals generated by reading head 42 are transmitted to a motion decoder 52.

If desired, a voltage barrier can be employed between reading head 42 and optical isolater 55. The use of a voltage barrier is recommended for use in hazardous vapor areas, in order to assure that only low voltage signals are present at reading head 42. The optical isolater 55 is employed to convert the low voltage signal to a higher voltage signal. This higher voltage signal is then transmitted from the isolater to motion decoder 52. Although a voltage barrier may be employed, it has been found that the system of the present invention operates efficiently in most installations without the barrier. However, if desired, the barrier may be employed.

Motion decoder 52 receives the signals from reading head 42 and determines the direction of movement of blade 22, namely whether metering blade 22 is being raised or lowered by drive motor 34. The motion decoded information is transmitted to anti-coincidence summer 53.

In accordance with the present invention, the opposite end of metering blade 22 comprises a substantially identical construction and processing arrangement as detailed above. The movement of metering blade 22 causes reading head 44 to generate a signal directly proportional to each line of scale 45 which passes by reading head 44. Reading head 44 transmits these signals to motion decoder 58, which determines whether motor 36 is raising or lowering metering blade 22. Then, the motion decoded signals are transmitted from decoder 58 to anti-coincidence summer 53.

Anti-coincidence summer 53 assures that the signals received from motion decoder 52 and 58 are transmitted in their entirety to dual counter/comparator 60. This is achieved by constructing anti-coincidence summer 53 to allow only one signal at a time to pass to counter/comparator 60. If two signals are received by anti-coincidence summer 53 simultaneously, summer 53 holds one signal until the other signal has been completely transmitted to counter/comparator 60.

Dual counter/comparator 60 is cooperatingly associated with registers 61 and 62. Register 61 contains the actual position of one side of blade 22, referenced in FIG. 3 as side "A", while register 62 contains the actual position of the opposite end of metering blade 22, referenced in FIG. 3 as side "B". When dual counter/comparator 60 receives the signals from reading heads 42 and 44, which signals represent the movement of doctor blade 22, counter/comparator 60 continuously counts the signals received keeping track of whether the signal represents side "A" or side "B" of metering blade 22, and updates register 61 or register 62 by either adding or subtracting the information received from the position represented in the register.

During the initial startup of the precise metering blade positioning system of the present invention, control system 25 must be calibrated to a zero position, the position at which blade 22 would be in contact with roller 23. As detailed below, this calibration is achieved without actual contact between roller 23 and blade 22, thereby preventing unwanted damage to either of these components.

Once calibrated, all of the counters and registers in system 25 are set in order to assure that the desired inherent accuracy in this system is attained. Then, blade 22 is manually raised to the desired, "home" or operating position, by employing manual drive means detailed below. During this manual operation, reading heads 42 and 44 continuously track the movement of blade 22, delivering the signals to dual counter/comparator 60. Dual counter/comparator 60 continuously updates position register 61 with all of the information representing the movement of side "A" of metering blade 22, while also continuously updating position register 62 with all of the information received from side "B" of metering blade 22.

When metering blade 22 has been manually raised to the precise, desired "home" or operating position, the manual movement of metering blade 22 is terminated, and the system is allowed to operate automatically, to assure metering blade 22 is maintained in the precise desired, perfectly aligned position with roller 23.

Once blade 22 has been moved into its precisely desired position, dual counter/comparator 60 maintains perfect alignment by comparing the position shown by register 61 with the position shown by register 62. If both positions are identical, the dual counter/comparator 60 knows that the precise desired aligned position is achieved.

However, if the position represented in register 61 is greater than the position represented in register 62, a signal is transmitted along line 65 to the negative side of motor 36, activating motor 36 to move side "A" of metering blade 22 downwardly.

Similarly, if the position in register 61 is less than the position represented in register 62, dual counter/comparator 60 transmits the signal along line 66 to the positive side of motor 36, causing motor 36 to raise side "A" of metering blade 22 to be in the identical position in which the side "B" of metering blade 22 is located. As soon as the positions in registers 61 and 62 are identical, the movement of motor 36 is terminated and the system is in its desired, precise position with metering blade 22 completely aligned and parallel to cooperating roller 23.

Once metering blade 22 is positioned in the precise desired location, in aligned parallel relationship with roller 23, the system is ready for operation. During operation, reading heads 42 and 44 continuously monitor the position of metering blade 23 by continuously transmitting the signals detailed above to dual counter/comparator 60.

Dual counter/comparator 60 monitors the information from reading heads 42 and 44, updates registers 61 and 62, and continuously compares the position represented by registers 61 and 62 to assure that both registers contain identical positions. If, at any time during the operation of the system, a position represented by register 61 is greater or less than the position represented by register 62, a signal is transmitted to motor 36 to move side "A" of metering blade 22 into precisely the identical position as the opposed side "B" thereof.

Control system 25 of the present invention also incorporates a home position counter 68 which is cooperatingly associated with a home position set switch 69 and a home position activate switch 70. Home counter 68 and its associated switches 69 and 70 are employed to allow metering blade 22 to be moved out of its precisely desired "home" position for various operational reasons, such as additional coatings or maintenance requirements, and be quickly and easily activated back to the precisely desired "home" location.

In operation, once metering blade 22 has been located in the precisely desired "home" position for the initiation of the machinery and its normal operation, home set switch 69 is activated to reset home counter 60 to zero.

During operation, home counter 68 continuously monitors the signals produced by reading head 44 which represents the movement of side "A" of metering blade 22, maintaining a running total of all increases and decreases side "A" of metering blade 22 experiences during its operation. Generally, home counter 68 will have a reading of zero, since dual counter/comparator 60 continuously monitors and maintains side "A" of metering blade 22 identical with the precisely desired home position represented by side "B" of metering blade 22.

In those situations where adjustments must be made to the system, metering blade 22 will be moved out of its desired home position to an alternate position in order to allow the particular adjustments to be made. During this movement, home counter 68 continuously monitors and records the pulses produced by reading head 44, which represents the movement of metering blade 22 from the home position to this alternate position.

Once the desired adjustments have been made, metering blade 22 is quickly and easily returned to the desired home position by merely activating the home seek switch 70. When activated, switch 70 causes home counter 68 to activate the negative side of motors 34 and 36 in order to move metering blade 22 back to its "home" position.

Home counter 68 continuously monitors the movement of metering blade 22 by counting down to the zero position, which represents the precise, desired home position. Once this position is reached, motors 34 and 36 are de-activated. Dual counter/comparator 60 also provides its continuous comparison of one end of metering blade 22 to the opposed end thereof, in the manner detailed above, thereby assuring that metering blade 22 remains in the precise desired home position, ready for the operation to continue.

Control system 25 also incorporates an increment pre-set thumbwheel 73, an increment load switch 74, and an increment counter 75. Pre-set thumbwheel 73 is employed for the operator to insert any desired, precise incremental distance through which metering blade 22 must move during the operation of the system. Typically, increments required for adding additional coating layers are inserted on the increment pre-set thumbwheel 73, to allow metering blade 22 to be raised to a particular desired incremental distance above the original "home" position.

In order to achieve this desired incremental movement, the increment load switch 74 is pressed to automatically transmit the desired, pre-set, incremental information from thumbwheel 73 into increment counter 75. Incremental counter 75 then activates the positive side of motors 34 and 36 to move blade 22 through the desired incremental distance to the precise, desired, second position. Once motors 34 and 36 have been activated, incremental counter 75 receives the movement signals from read head 44 and counts the signals up to the desired pre-set incremental position. Once the pulses received from read head 44 equals the desired pre-set incremental travel which was desired, counter 74 deactivates motors 34 and 36.

By employing this increment feature, any desired number of incremental advances can be made since incremental counter 75 automatically resets to the desired pre-set setting upon activation of switch 74. In this way, a plurality of additional steps, such as coatings, can be easily accommodated.

In order to assure efficient, accurate positioning of metering blade 22, metering blade 22 must be initially set to a zero position, so that the system knows the precise location at which metering blade 22 is in touching contact with roller 23. Typically, however, contact between metering blade 22 and roller 23 is not desirable, since damage may be caused to either the metering blade or the roller. Consequently, the metering blade is positioned above the roller a precise distance which is measured with accurate distance measuring means such as micrometers, calipers or the like.

Once metering blade 22 has been positioned in a precise, measured distance above roller 23, thumbwheel 77 is set with this precise distance. In this way, the entire system operation is aware of the initial measured position of metering blade 22 above cooperating roller 23 so that this distance can be included in all calculations for determining the precise distance of metering blade 22 above roller 23.

In the preferred embodiment, control system 25 also incorporates a position display/counter 78 which provides the operator with a visible digital reading of the precise position of metering blade 22 above the cooperating roller at any particular time. In the preferred embodiment, display/counter 78 is constructed to display the position produced by reading head 44, representing side "A" of metering blade 22. In operation, the pre-set initial gap position inserted in thumbwheel 77 is transmitted to display/counter 78 upon start up, so that all position changes of metering blade 22 properly reflect the exact position of metering blade 22 above its cooperating roller.

The construction of control system 25 is completed by incorporating a power-up switch 80, and manually activated motor drive means 81 and 82. Drive means 81 is connected to the plus side of motors 34 and 36 in order to provide the operator with the ability to directly raise metering blade 22, whenever desired, by activating switch 83. Similarly, motor control means 82 is connected directly to the negative side of motors 34 and 36 in order to directly lower metering blade 22 any time the operator activates motor control means 82 by pressing switch 84. In this way, manual override or manual control of the metering blade can be attained whenever desired. As discussed above, the manual motor drive means are used during the startup of the system to move blade 22 from its zero-adjustment position to its desired, precise, aligned operating position.

In FIG. 4, an alternate embodiment for the precision controlled metering blade positioning system of the present invention is shown. In this alternate embodiment, control system 25 is constructed in a manner very similar to the control system shown in FIG. 3 and detailed above. In this regard, all substantially identical components of control system 25 are shown in FIG. 3 with identical reference numerals with the detailed disclosure presented above being equally applicable to the construction detailed in FIG. 4.

The major improvement attained by the embodiment shown in FIG. 4 is the ability of control system 25 to assure the operator that the specifically desired home position is always maintained by the system regardless of any possible unwanted movement of metering blade 22 from the home position.

Although the embodiment detailed above and shown in FIG. 3 operates efficiently in most applications, it has been found that in certain operations, the entire metering blade 22 may be shifted out of the desired home position. Although side "A" of metering blade 22 automatically compensates to assure that its position is identical to the position of side "B" of metering blade 22, the system shown in FIG. 3 does not provide automatic comparison of the actual position of side "B" to the desired, originally set, home position. Consequently, if the entire blade 22 were shifted out of the home position, metering blade 22 would automatically be readjusted to be in perfect parallel relationship with coating roller 23, however, metering blade 22 may be shifted out of the precisely desired home position.

By employing control system 25 as detailed in FIG. 4, this potential problem is completely obviated. In this embodiment, control system 25 incorporates two independent dual counter/comparators 60 and 67.

Dual counter/comparator 60 is cooperatively associated with position registers 61 and 62. In this embodiment, once the blade has been manually raised into the precise, desired home or operating position, this position, referred to in FIG. 4 as position "A1", is contained and locked in register 61. Position register 62 contains the actual position for side "B" of metering blade 22. Once position register 61 has the desired home position contained therein, manual blade movement ceases, causing this position to be locked in register 61 and maintained as the master position for use as the position to which register 62 is compared.

This position lock-in is achieved by employing gate or switch means 71 and 72 which are active only during manual operations, raising or lowering of the blade, as well as incremental move and seek home operations. When active, switch means 71 and 72 allow the signals from read head 44 to be transmitted through anti-coincidence summer 53 to dual counter/comparator 60.

Once blade 22 has been moved into the precisely desired home position, manual control is terminated and the system is allowed to operate automatically. This causes switch means 71 and 72 to open, preventing further signal transmission therethrough. As a result, dual counter/comparator 60 does not receive any further signals representing position "A1", causing the position represented in register 61 to be effectively fixed or locked therein.

During the manually controlled movement of blade 22, the reading head 42 produces signals which represent the movement of side "B" of blade 22. These signals are transmitted to anti-coincidence summer 53 and therefrom to dual counter/comparator 60. Dual counter/comparator 60 receives these signals and continuously updates register 62 to contain the actual position of side "B" of blade 22.

Once in automatic operation, dual counter/comparator 60 continues to track the position of side "B" of blade 22 by adding or subtracting the signals received from read head 42 from the position represented in register 62. In addition, dual counter/comparator 60 compares the position in register 61, which represents the precise, desired home position, with the position contained in register 62, which represents the actual position of side "B" of metering blade 22. When the "A1" position, or the position contained in register 61, equals the "B" position, the position contained in register 62, the dual counter/comparator 60 knows that side "B" of metering blade 22 is at the precisely desired location. At this time, any activation of motor 34 ceases.

However, if dual counter/comparator 60 sees that the "B" position is greater than the "A1", the dual counter/comparator 60 activates the minus side of motor 34, in order to lower the "B" side of metering blade 22 until it reaches the precisely desired position, represented by the position in register 61.

Similarly, when dual counter/comparator 60 recognizes that the "B" position represented by register 62 is less than the desired "A1" position, represented in register 61, dual counter/comparator 60 activates the plus side of motor 34 to raise the "B" side of metering blade 22 until that side of blade 22 is in the exactly, precise desired position.

In addition to dual counter/comparator 60, this embodiment of control system 25 incorporates a second dual counter/comparator 67, which has associated therewith position registers 63 and 64. Position register 63 is similar to position register 61 in that the precisely desired home position or operating position is set and locked therein, and, once locked therein, becomes the master position for use by dual counter/comparator 67. Position register 64 represents the actual position of side "A" of metering blade 22 and is referred to in FIG. 4 as position "A2".

As detailed above, during start-up, the manual drive means are employed to raise blade 22 to the precisely desired home or operating position. The use of the manual drive means activates switch means 71 and 72 to transmit the signals received from reading head 44 to anti-coincidence summer 53' and to dual/counter comparator 67. As shown in FIG. 4, the signals produced by read head 44, which represents the movement of side "A" of metering blade 22 are transmitted through motion decoder 58 and are then split into two, independent pairs of lines, with one pair of lines being connected to switch means 71 and 72, while the other pair of lines is connected directly to anti-coincidence summer 53'.

The signals transmitted to switch means 71 and 72 represent the precisely desired home or operational position which will be employed as the master position, referred in FIG. 4 as "A1". The signal from read head 44 which goes directly to anti-coincidence summer 53' is employed as the "A2" position, or the actual position of side "A" of metering blade 22. Both the "A1" and the "A2" signals are transmitted to anti-coincidence summer 53' which assures that only one signal at a time is transmitted to dual/counter comparator 67.

Upon receipt of the signal representing the "A1" position, dual/counter comparator 67 adds or subtracts the counts received from register 63, thereby updating register 63 to reflect the desired "A1" position. Similarly, the signals received by dual/counter comparator 67 which represents the "A2" position cause dual/counter comparator 67 to update position register 64 to reflect the actual position of side "A" of metering blade 22.

As discussed above, as soon as blade 22 has been manually moved into the desired home or operating position, the manual driving of blade 22 is terminated, causing switch means 71 and 72 to open, thereby preventing any further signals from being transmitted from switch means 71 and 72 to anti-coincidence summer 53'. This, in effect, locks the position in register 63 as the master position, which represents the precise, desired home or operating position.

Once the desired home or "A1" position has been fixed in register 63, the system is ready to operate automatically to maintain blade 22 in this desired position. In operation, dual counter/comparator 67 adds or subtracts counts from reading head 44 representing the movement of side "A" of metering blade 22. In addition, dual counter/comparator 67 continuously compares the position in register 63 with the position in register 64. If the position in register 63, which represents the desired home ("A1") position is greater than the "A2" position in register 64, representing the actual position of side "A" of metering blade 22, the plus side of motor 36 is activated to raise side "A" of metering blade 22.

Alternatively, whenever dual counter/comparator 67 recognizes the position in register 63 ("A1") as being less than the position in register 64 ("A2"), dual counter/comparator 67 activates the minus side of motor 36, thereby lowering side "A" of metering blade 22 to move toward coating roller 23. This process continues until dual counter/comparator 67 finds that the "A2" position in register 64 is identical to the "A1" position in register 63. When this condition exists, dual counter/comparator 67 knows that the precisely desired target position has been attained.

During the operation of metering blade 22 and coating roller 23, control system 25 is continuously operating to maintain metering blade 22 in the precisely desired target position. In this embodiment of the present invention, this is efficiently achieved with dual counter/comparators 60 and 67 continuously monitoring and comparing their associated registers to assure that registers 61-62 and registers 63-64 contain identical values. If, during the application of a particular coating to a substrate, metering blade 22 is forced out of the precisely desired home position, either register 64 or register 62 will contain a position which is not identical to the "A1" position contained in both register 61 and 63. As a result, dual counter/comparator 60 or 67 will activate motor 34 or 36 to make the appropriate adjustment to bring either side "A" or side "B" of metering blade 22 into the precisely desired home position.

This embodiment of the present invention assures that even if both side "A" and side "B" of metering blade 22 were simultaneously moved to either similar or dissimilar positions, neither of which corresponds to the precisely desired target or home position, both side "A" and side "B" of metering blade 22 will immediately be brought to the precisely desired home position by the activation of motor 34 and 36, since the particular position to which metering blade 22 has been moved will not correspond to the home position set in position registers 61 and 63. As a result, the construction of the precision controlled metering blade positioning system of the present invention, as shown in FIG. 4, attains the desired precise positioning of a metering blade above a coating roller with accuracy heretofore unattainable, while also assuring that the metering blade is continuously maintained in this precisely desired position, without fear that unwanted movement of the blade out of the desired position has gone undetected or uncorrected.

As discussed above, logic gate or switch means 71 and 72 assure that register 63 of dual counter/comparator 67 and register 61 of dual counter/comparator 60 both contain the precise, desired, home or operating position in which the operator wishes to have metering blade 22 maintained for a particular operation. In order to assure that dual counter/comparator 60 and 67 are automatically updated to properly reflect the precisely desired position sought by the operator, gate means 70 and 71 are activated whenever home counter 68 or incremental counter 75 are activated, in addition to activation whenever the manual drive means are employed, as detailed above.

In this way, whenever the operator wishes to have metering blade 22 raised through a pre-set incremental distance, in the manner detailed in reference to FIG. 3, incremental counter 75 is activated, in order to raise metering blade 22 through the precisely desired pre-set incremental distance. In the preferred embodiment, the activation of incremental counter 75 also activates gate means 71 and 72 so that the position represented in registers 61 and 63, which contains the master or "A1" position, is updated to include the incremental distance.

In the preferred embodiment, as shown in FIG. 4, the activation of incremental counter 75 causes the plus side of motor 36 to be activated, tnereby raising side "A" of metering blade 22. However, since the movement of side "A" of metering blade 22 causes reading head 44 to transmit signals corresponding to this movement with the signals transmitted by reading head 44 being transmitted through gate means 71 and 72 to dual counter/comparator 60 for updating position register 61, dual counter/comparator 60 simultaneously activates drive motor 34, since the position in register 62 is less than the position in register 61. As a result, both side "A" and side "B" of metering blade 22 are simultaneously raised until the particularly desired incremental distance has been attained.

Once the precisely desired incremental distance has been traveled by metering blade 22, incremental counter 75 deactivates motor 36, thereby deactivating gate means 71 and 72 to effectively lock the new operating position in register 61 of dual counter/comparator 60 and register 63 of dual counter/comparator 67. In this way, the system is ready to continue to operate in its new position, with the desired, automatic, continuous monitoring of blade 22, assuring that both ends of metering blade 22 are maintained in the precisely desired, perfectly aligned, parallel position relative to roller 23.

As discussed in detail in reference to FIG. 3, any time metering blade 22 is raised out of its home position for any particular operation, home counter 68 may be activated to automatically move metering blade 22 back to the desired home position. As with the activation of incremental counter 75, the activation of home counter 68 activates gate means 71 and 72, in order to update registers 61 and 63 with the precise, desired home position to which metering blade 22 is to be returned.

Once activated, home counter 68 causes the minus side of drive motor 36 to be activated, causing side "A" of metering blade 22 to be lowered the precise number of counts contained in home counter 68. As described above, since the movement of side "A" of metering blade 22 simultaneously causes the master position in register 61 to be decreased, dual counter/comparator 60 simultaneously activates the minus side of drive motor 34 to lower the "B" side of metering blade 22. As a result, both sides of metering blade 22 are simultaneously lowered the precise number of counts contained in home counter 68.

Once home counter 68 reaches a zero count, motor 36 is deactivated, thereby simultaneously deactivating switch means 71 and 72. This effectively locks registers 61 and 63 with the precisely desired home position into which blade 22 has been returned. Dual counter/comparators 60 and 67 then assure that the actual position of side "A" and side "B" of metering blade 22 is maintained at the precisely desired home position locked in registers 61 and 63.

In FIG. 5, an alternate embodiment of the present invention is shown. In this embodiment, the precision metering blade positioning system of the present invention is shown incorporating a third alternate construction for control system 25. In this embodiment, control system 25 incorporates a master position, referred to in FIG. 5 as position "A" with a master position register and display 100. Position register and display 100 is independent of the position registers in which the precise position of each side of metering blade 22 is recorded.

In addition, as is detailed below, master position register and display 100 is directly connected to a programmable controller 101 in which all of the desired information for home positions, incremental moves, and laps for a plurality of alternate programs are stored. In this way, master position register 100 can be automatically updated to reflect any desired, pre-programmed position stored in programmable controller 101.

As with the previous embodiments detailed above, control system 25 incorporates a reading head 42, which generates signals in response to the movement of side "B" of metering blade 22. In this embodiment, the signals generated by reading head 42 are transmitted to motion decoder/counter 102 which then updates left side position register 103 to contain the precise position at which the left-hand side, side "B" of metering blade 22 is located. In this embodiment, a digital display 104 is provided to allow the operator to quickly see the precise position of side "B" of metering blade 22.

Similarly, reading head 44 is mounted on the opposed side of metering blade 22, referred to in FIG. 5 as side "C", and generates signals responsive to the movement of the right-hand side of metering blade 22. The signals generated by reading head 44 are transmitted to a motion decoder/counter 106 which then transmits the signals to position register 107 in order to assure that position register 107 contains the actual position at which side "C" of metering blade 22 is located. In addition, a digital display 108 is also employed to provide the operator with a direct read-out of the position of side "C" of metering blade 22.

As with the previous embodiments detailed above, metering blade 22 moves in response to the activation of motors 34 and 36, which are mounted at opposed ends of metering blade 22. In this embodiment, the activation of drive motor 34 is controlled by comparator 110, while the activation of drive motor 36 is controlled by comparator 111.

As shown in FIG. 5, comparator 110 compares the position shown in master register and display 100 with the position contained in register 103, which corresponds to the actual position of side "B" of metering blade 22. Whenever comparator 110 sees that the position in register 103 is equal to the position in register 100, comparator 110 knows that side "B" of metering blade 22 is in the precisely desired position and further activation of motor 34 is terminated.

However, whenever the position in register 103 is less than the master position in register 100, comparator 110 activates the plus side of motor 34 in order to raise side "B" of metering blade 22 until the position in register 103 equals the position in register 100. Similarly, whenever comparator 110 sees that the position in register 103 is greater than the master position in register 100, comparator 110 activates the minus side of motor 34, in order to lower side "B" of metering blade 22 until side "B" of metering blade is in the specifically desired master position, with the position in register 103 equivalent to the position in register 100.

In a substantially identical manner, comparator 111 raises or lowers side "C" of metering blade 22 by activating drive motor 36, until comparator 111 sees that the position in register 107, which contains the actual position of side "C" of metering blade 22, is identical to the specifically desired master position in register 100. In this way, comparators 110 and 111 provide the desired activation of drive motors 34 and 36, to assure that metering blade 22 is placed in the specifically desired master position, while also continuously monitoring the movement of metering blade 22 to assure that metering blade 22 is maintained in the specifically desired position.

As thoroughly detailed above in reference to both FIGS. 3 and 4, metering blade 22 is initially adjusted to a specifically measured position in order to inform the entire system of the zero position, the position at which metering blade 22 would be in contact with roller 23. In this embodiment, the initial, measured, gap set-up position is inputted to the system using input means 114. As shown in FIG. 5, input means 114 is connected to all of the pertinent registers so that the entire system is immediately informed of this specifically measured gap position, so that all registers can properly reflect the zero position of metering blade 22 and roller 23. As a result, once this initial gap setting is inputted to the system using input means 114, the system is ready for automatic operation.

In this embodiment, the remainder of control system 25 consists of programmable controller 101. For purposes of convenience and explanation, programmable controller 101 is depicted for operating four separate and distinct pre-programmed operations. However, as is readily apparent to one of ordinary skill in the art, programmable controller 101 may be constructed with any desired number of pre-programmed instructions, limited only by the overall capacity of the controller memory. By referring to FIG. 5, along with the following detailed description, the overall operation of control system 25 can be understood, regardless of the particular number of pre-set operations.

As is readily apparent to one of ordinary skill in the art, all desired pre-programmed information is recorded in programmable controller 101 in the conventional, well known manner. In this way, once the desired information has been recorded in the controller's memory, the system is ready for automatic operation, without operator supervision being required.

In the embodiment shown in FIG. 5, four independent programs are pre-recorded for applying various coatings to a continuous belt. In typical continuous belt installations, the substrate to which the coating is applied comprises an elongated member, the ends of which have been sewn, or otherwise affixed, thereby forming a continuous loop. In addition, the adjoined edges are marked, typically with a metallic strip, in order to inform the control system that one complete lap has been attained. As a result, the plurality of desired coatings can be automatically achieved without requiring operator supervision or changes.

As shown in FIG. 5, programmable controller 101 incorporates a program selector switch 118, by which the operator informs programmable controller 101 which of the four pre-programmed operations the system is to automatically operate. Once this selection has been made and the system has been powered up by employing switch 80, the operator needs only to activate either switch 119 or switch 125, in order to select either an automatic home position movement or an automatic, pre-programmed incremental advance.

In regard to home position movement, the home position means incorporates, in addition to switch 119, home position control means 120 and four home position registers 121, 122, 123, and 124. Each of the home position registers 121, 122, 123, and 124 have recorded therein the four separate and distinct alternate home positions which have been preprogrammed into the particular register by the operator for each of the four alternate programs the operator can select. Consequently, once program selector switch 118 has been set to the desired program and switch 119 has been activated, the particular register containing the selected program is loaded into home position control means 120, which then resets master position register 100 with the desired, preselected home position.

Once the desired home position has been set into master position register 100, comparators 110 and 111 activate drive motors 34 and 36, since the position represented in master register 100 is different from the positions represented in registers 103 and 107. In the manner described above, drive motors 34 and 36 continue to move metering blade 22 until both ends of metering blade 22 have been moved into the precise position contained in master position register 100. Once this position has been reached, metering blade 22 is in the precisely desired home position, ready for operation.

When switch means 125 is activated, programmable controller 101 automatically commences the incremental advance program which has been selected by the operator, As is readily apparent to one of ordinary skill in the art, the increment advance program may comprise a plurality of different steps, variation of steps, or alternate procedures. However, for purposes of explanation and example only, and not for purposes of limitation, a typical incremental advance sequence is detailed below in order to show the inherent flexibility and capacity for the precision metering blade positioning system of this invention.

In the embodiment detailed in FIG. 5, programmable controller 101 incorporates an idle lap register 130 which is controllably interconnected with four, independent, preprogrammed registers 131. Each register 131 is preprogrammed with the number of idle laps the operator desires for each of the four alternate selectable programs.

Typically, an idle lap is employed to assure that the system is running correctly prior to actually applying a coating to the substrate. Once switch means 125 has been activated, the particular register 131, which corresponds to the program selected, loads the number of idle laps contained in register 131 into idle lap register 130. The system then is activated to run through the desired number of idle laps, with pulse counter 132 recording the number of laps or cycles through which the substrate passes, decreasing register 130 for each lap, until register 130 reaches zero.

In this embodiment, programmable controller 101 also incorporates a first increment controller 135 which is directly connected with four separate and independent registers 136 in which the first desired incremental move for blade 22 is preset for each of the four alternate programs.

In operation, once the system has successfully completed the desired number of idle laps, the particular first increment register 136 associated with the pre-selected program transmits the desired increment to the first increment controller 135 which then transmits the desired incremental position to master position register 100. Once master position register 100 has received the desired incrementally advanced position, comparators 110 and 111 activate drive motors 34 and 36, in a manner detailed above, in order to move metering blade 22 into the precisely desired position. Once this position has been reached, motors 34 and 36 are deactivated, and the system is ready for operation.

Since many operations require a plurality of laps to be run at the same incremental distance, in order to assure that the desired quantity of coating has been applied to the substrate, programmable controller 101 also incorporates a lap register 137 into which is loaded the precise number of laps desired for the pre-selected program from one of the four pre-programmed registers 138. Each of the registers 138 contains the precise number of laps through which the operator desires the system to run at the pre-programmed increment.

In addition, pulse counter 139 is associated with lap register 137 in order to decrease lap register 137 each time a complete lap or cycle has been achieved. In this way, the precisely desired number of laps are counted and the precisely desired coating is automatically applied.

Programmable controller 101 also incorporates a lap between increment register 140 which is directly connected with four, independent laps between increment registers 141. Registers 141 contain the desired number of laps through which the operator wishes to have the system run for each of the four pre-selectable programs prior to proceeding to the next desired step. In this embodiment, once all of the desired application laps have been attained, as controlled by lap register 137, laps between increment register 140 assures that the desired number of idle laps are attained before proceeding to the next step.

As shown in FIG. 5, programmable controller 101 preferably incorporates automatic pause means 143 which stops the system after the idle laps have been completed, until the operator has re-activated the system by employing switch means 125. Once re-activated, switch means 125 automatically advances to a second increment controller 145 for applying a second incremental coating, as desired for the particular program selected.

As detailed above in regard to the first increment controller 135, second increment controller 145 is connected directly to four independent second increment registers 146 in which the desired second increment for each of the four programs has been recorded. Once the second increment controller 145 has been activated, the precisely desired second increment is loaded into second increment controller 145 which then transmits the desired position to master position register 100.

As detailed above, this automatically causes drive motors 34 and 36 to be activated in order to bring metering blade 22 into the precisely desired position. Once in the precisely desired second increment position, the system is ready for receiving the second coating in the precisely desired number of laps.

In order to assure the system is controlled in the manner desired, programmable controller 101 incorporates a lap register 147 which is directly associated with the four registers 148 in which the precisely desired number of laps for each of the selectable programs has been inserted. In operation, the number of laps recorded in register 148 associated with the pre-selected program is loaded into lap register 147 which then controls the laps through which the system operates until the precise number of laps has been completed. As detailed above, pulse counter 149 tracks the number of laps through which the system is operating and assures that lap register 147 attains the precise number of laps desired.

Once completed, the system automatically cycles to the lap between increment register 150. Register 150 has been pre-loaded with the precise number of idle laps desired for the pre-selected program, since lap between increment registers 151 are associated therewith and provide the desired number of idle laps to register 150. Once these laps have been completed, the desired pre-programmed operation has been fully and completed attained and the system automatically stops, in order to allow the substrate to be removed and replaced by a new substrate for having the coating applied thereto.

It will thus be seen that the objects set forth above, among those made apparent from the preceding description are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language might be said to fall therebetween.

Having described my invention, what I claim as new and desire to secure by Letters Patent is:

1. A precision positioning system for maintaining two cooperating elements in perfectly aligned, juxtaposed, spaced parallel relationship along their entire length comprising:
   A. a first element comprising an elongated cylindrically shaped roller member,
      1. supportingly mounted along the central axis thereof, and
      2. journaled for rotation about its central axis;
   B. a second element comprising an elongated member
      1. mounted in juxtaposed, spaced, cooperating relationship with said first element, and
      2. supportingly retained in position at the opposed terminating ends thereof;
   C. two separate, independent drive means, each being controllably engaged with opposed ones of said support ends of the second element for movement of said end independently of the movement of the opposed end;
   D. two separate, independent, precision, movement measuring means,
      1. each being mounted at opposed ends of said second element for precisely and independently measuring the distance through which said end of said second means moves, and
      2. generating signals directly corresponding to the distance measured; and
   E. control means
      1. interconnected with said precision movement measuring means and said drive means, and
      2. responsive to the signals generated by the movement of said second element for controllably moving the drive means in order to assure each end of said second element is moved into a precisely desired position, assuring that the second element is in juxtaposed, spaced, perfectly parallel, aiigned relationship with said first element.

2. The precision positioning system defined in claim 1, wherein said second element comprises a metering roller, rotationally mounted along its central axis.

3. The precision positioning system defined in claim 1, wherein said second element comprises a precision metering blade extending substantially the entire length of said first element and is supportingly mounted by strut members at opposed ends thereof.

4. The precision positioning system defined in claim 1, wherein said first element is mounted for rotational movement only and is not axially translatable 5. A precision positioning system for maintaining a metering element in perfectly aligned, juxtaposed, spaced parallel relationship with a non-translatable rotating roller said system comprising:
   A. roller means journaled for rotation about the central axis thereof while being fixedly mounted for non-translational movement;
   B. elongated metering means
      1. positioned in juxtaposed, spaced, aligned. substantially parallel relationship with said roller means and
      2. mounted for movement relative to said journaled roller means by support members extending from both terminating ends thereof;
   C. two separate independent precision linear transducers,
      1. each being mounted at opposed ends of said metering means for precisely and independently measuring the distance through which said end of said metering means moves and
      2. generating signals directly corresponding to the distance measured;
   D. two, separate independent drive motors each of said motors being
      1. mounted at opposed ends of said metering means and
      2. responding to an activation signal for controllably moving said end of said metering means either towards or away from the roller means; and
   E. control means interconnected with said linear transducers and said drive motors for receiving the signals generated by said linear transducers regarding the movement of said metering means, processing said signals, and generating activation signals for controlling said drive motors to assure that the metering means is maintained during all operations in perfectly aligned, juxtaposed, spaced parallel relationship to said roller means, whereby a precise positioning system. is provided which continuously monitors and maintains the metering means in perfectly aligned parallel relationship with the fixedly mounted rotating roller means. providing continuous, trouble-free application of a specifically desired coating thickness to the substrate passing therebetween.

6. The precision positioning system defined in claim 5, wherein each of said linear transducers is further defined as comprising
   3. a high resolution, glass lined scale member fixedly mounted to the movable metering means, and
   4. a reading head fixedly mounted to a non-movable support for said metering means and positioned in juxtaposed, spaced, directly cooperating relationship with said glass lined scale member for precisely measuring each line of said glass lined scale member, whereby the desired, independent precision measurement of the distance of movement of each end of said metering means is provided.

7. The precision positioning system defined in claim 6 wherein said control means is further defined as comprising
   1. a first register connected for receiving signals corresponding to the movement of one end of the metering means, processing said signals and recording therein the actual position of said end of said metering means.
   2. a second register connected for receiving signals corresponding to the movement of the opposed end of said metering means, processing said signals, and recording therein the actual position of the opposed end of the metering means,
   3. a first comparator
      a. interconnected with said first register and said second register and adapted for continuously comparing the position represented in said first register with the position represented in said second register,
      b. responsive to differences in said compared register positions for initiating an activation signal to at least one of said drive motors to either raise or lower one end of said metering means to bring said end of the metering means into the identical, aligned, precise position as the opposed end of said metering means.

8. The precision positioning system defined in claim 7, wherein said control means further comprises 4. a third position register and a fourth position register, each of which are responsive to signals representing a precise, specifically desired master position to which the operator wishes to have the metering means maintained and 5. a second comparator responsively connected to said third position register and said first position register and adapted for continuously comparing the positions represented in each of said registers, and responsive to differences in said register positions to activate one of said drive motors to raise or lower said end of said metering means in order to assure that said end of said metering means is in the precisely desired position, as represented by the master position in said third register, and 6. said first comparator being responsively connected to said second register and said fourth register for comparing the positions represented in each register and responsive to differences in said compared register positions to activate said second drive motor to raise or lower the opposed end of said metering means to bring said end of said metering means into the identical position represented by the master position in said fourth register.

9. A precision positioning system defined in claim 5, wherein said control means further comprises 1. automatically controlled incremental advance means for moving said metering means through a precise, predetermined, incremental distance comprising a. an incremental preset thumbwheel on which said operator manually sets the precisely desired incremental distance b. an incremental load switch for activating the incremental advance means and c. counter means responsive to said activation switch for automatically receiving the preset incremental advance desired and initiating activation signals for said drive motors to raise said metering means, while simultaneously receiving signals representing the precisely measured movement of said metering means for decreasing the counter until the precisely desired increment has been attained, thereby ceasing any further activation of said drive motors, whereby a quick and efficient precisely desired incremental advance of the metering means is attained.

10. The precision positioning system defined in claim 5, wherein said system further comprises F. motion decoder means associated with each of said linear transducers for receiving the signals generated by said linear transducers and processing said signals to transmit some information with the direction of movement of said metering means precisely defined.

11. The precision positioning system defined in claim 5, wherein said system further comprises F. at least one anti-coincidence summer for receiving the signals from said linear transducers and assuring that the signals are transmitted in their entirety prior to transmitting the next signal 12. The precision positioning system defined in claim 5, wherein said system further comprises F. automatic home movement means for automatically moving the metering means to a previously designated home position, comprising 1. a home movement activation switch, 2. a home reset switch, and 3. a home counter responsive to being reset to zero by said home reset switch and connected to one of said linear transducers for receiving signals representing the movement of the metering means from the home position to an alternate position, and responsive to activation by said activation switch to generate an activation signal for initiating the drive motors to return the metering means to the home position, and deactivating the drive motors when the home position has been reached.

13. The precision positioning system defined in claim 5, wherein said system further comprises F. manually activated motor drive means for moving said metering means to any desired position by manually overriding and directly driving said drive motors; whereby said metering means can be moved upwardly or downwardly whenever desired by the operator.

14. The precision positioning system defined in claim 5, wherein said system further comprises E. position preset means for setting a precise zero position of said system without actually injuring the component parts, thereby assuring that all movement of said metering means from said roller will continue with equal precision and accuracy.

15. The precision positioning system defined in claim 5, wherein said control means is further defined as comprising 1. a first register connected for receiving signals corresponding to the movement of one end of the metering means, processing said signals, and recording therein the actual position of said end of said metering means.

2. a second register connected for receiving signals corresponding to the movement of the opposed end of said metering means, processing said signals; and recording therein the actual position of the opposed end of the metering means.

3. a third register connected for receiving signals corresponding to the master position at which the operator desires the metering means to be located, processing said signals and recording therein the master position for said metering means, 4. a first comparator a. interconnected with said first register and said third register and adapted for continuously comparing the position represented in said first register with the position represented in said third register, and b. responsive to differences in said comparator register positions for initiating an activation signal to one of said drive motors to either raise or lower one end of said metering means to bring said end of the metering means into the identical, precise position, as represented in said third register, and 5. a second comparator a. interconnected with said second register and said third register and adapted for continuously comparing the position represented in said second register with the position represented in said third register, and
  b. responsive to differences in said comparator register positions for initiating an activation signal to another one of said drive motors to either raise or lower one end of said metering means to bring said end of the metering means into the identical, precise position as represented in said third register, whereby the precision positioning system automatically compares the actual position of each end of the metering blade with the precise desired position and automatically moves each end, independently, into the precisely desired position.

16. The precision positioning system defined in claim 15, wherein said system is further defined as comprising
  F. a programmable controller
    1. capable of receiving and storing a plurality of alternate positions and sequential operations, and
    2. connected to said third register for delivering thereto signals representing the precisely desired master position for a particular operation.

* * * * *